United States Patent
Suzuki et al.

(10) Patent No.: US 6,500,506 B1
(45) Date of Patent: Dec. 31, 2002

(54) AROMATIC POLYESTER COMPOSITION AND ARTICLES THEREFROM

(75) Inventors: Minoru Suzuki, Matsuyama (JP); Yoichi Yoshida, Matsuyama (JP); Hiroki Nagano, Matsuyama (JP)

(73) Assignee: Teijin Limited, Tokyo (JP)

( * ) Notice: Subject to any disclaimer, the term of this patent is extended or adjusted under 35 U.S.C. 154(b) by 0 days.

(21) Appl. No.: 09/486,276

(22) PCT Filed: Jun. 25, 1999

(86) PCT No.: PCT/JP99/03416

§ 371 (c)(1),
(2), (4) Date: Feb. 25, 2000

(87) PCT Pub. No.: WO00/00548

PCT Pub. Date: Jan. 6, 2000

(30) Foreign Application Priority Data

Jun. 26, 1998 (JP) .............................. 10-180615
Aug. 17, 1998 (JP) .............................. 10-230623

(51) Int. Cl.⁷ .............................. B29B 9/12; C08F 32/06; C08F 32/08
(52) U.S. Cl. .................... 428/35.7; 428/36.6; 428/480; 525/437; 525/444; 604/403
(58) Field of Search ............................. 428/35.7, 36.6, 428/480; 525/437, 444; 528/302, 308, 308.1, 308.6; 604/403

(56) References Cited

U.S. PATENT DOCUMENTS 5,837,800 A * 11/1998 Suzuki et al. ............... 528/193
5,888,598 A * 3/1999 Brewster et al. ........... 428/35.7

FOREIGN PATENT DOCUMENTS

| EP | 0 926 197 A | 6/1999 |
|---|---|---|
| JP | 8-34910 | 2/1996 |
| JP | 10-86212 | 4/1998 |
| JP | 10-95903 | 4/1998 |
| JP | 11-20009 | 1/1999 |
| JP | 11-43589 | 2/1999 |
| JP | 11-43592 | 2/1999 |
| JP | 11-130947 | 5/1999 |

OTHER PUBLICATIONS

Patent Abstracts of Japan abstract of JP–A–11–43588, dated Feb. 16, 1999.
Patent Abstracts of Japan abstract of JP–A–11–43589, dated Feb. 16, 1999.
Patent Abstracts of Japan abstract of JP–A–11–43592, dated Feb. 16, 1999.
Patent Abstracts of Japan abstract of JP–A–9–208711, dated Aug. 12, 1997.

* cited by examiner

Primary Examiner—Sandra M. Nolan
(74) Attorney, Agent, or Firm—Sughrue Mion, PLLC

(57) ABSTRACT

An aromatic polyester composition which comprises 5 to 95 wt % of an ethylene naphthalenedicarboxylate copolymer and 95 to 5 wt % of an ethylene terephthalate (co)polymer and has a compatibility between these polymers of 0.15 to 0.5, and whose melting point lowers depending on the content of ethylene naphthalenedicarboxylate. This composition has excellent compatibility, transparency, barrier properties and heat resistance and is an excellent raw material for forming various molded products, particularly bottles. A bottle and its production process are also disclosed.

5 Claims, No Drawings

AROMATIC POLYESTER COMPOSITION AND ARTICLES THEREFROM

TECHNICAL FIELD

The present invention relates to an aromatic polyester composition comprising an ethylene naphthalenedicarboxylate copolymer and an ethylene terephthalate (co)polymer, molded products thereof and a bottle production process. More specifically, it relates to an aromatic polyester composition which is excellent in compatibility at the time of blending and transparency and which is hardly deteriorated by heat, molded products thereof and a bottle production process.

BACKGROUND ART

Polyethylene terephthalate and polyethylene naphthalenedicarboxylate polymers are mainly used for drink-related applications due to their excellent characteristic properties. However, polyethylene terephthalate, though excellent in terms of transparency, is slightly inferior in heat resistance. Therefore, it is desirable to improve the heat resistance of the polymer. Meanwhile, polyethylene naphthalenedicarboxylate, though having excellent properties such as transparency, heat resistance, ultraviolet screening properties and barrier properties, is more expensive than general-purpose resins. Therefore, it is difficult to grow the popularity of the polymer without a cost reduction. To overcome these defects of the polyesters, there are proposed polyethylene naphthalenedicarboxylate obtained by copolymerizing a terephthalic acid component, polyethylene terephthalate obtained by copolymerizing a naphthalenedicarboxylic acid component or a blend of a polyester whose main recurring unit is an ethylene terephthalate unit and a polyester whose main recurring unit is an ethylene naphthalenedicarboxylate unit.

Although a polyester obtained by copolymerizing a terephthalic acid component or naphthalenedicarboxylic acid component has the characteristic properties of the both components, when the amount of a copolymer component is increased, the polyester becomes almost amorphous and is inferior in handling properties. A blend of a polyester whose main recurring unit is an ethylene terephthalate unit and a polyester whose main recurring unit is an ethylene naphthalenedicarboxylate unit has excellent handling properties and has such an advantage that the blending ratio of these polyesters can be changed easily. However, a process for obtaining a polyester having high transparency must be under blending conditions, such as a high temperature and a long residence time, which are unfavorable for polyesters from the viewpoint of compatibility between them.

JP-A 11-43589 discloses a polyester resin composition comprising 99 to 60 wt % of a polyethylene terephthalate resin (A) and 1 to 40 wt % of a polyethylene naphthalate resin (B). In this composition, these resins have the following characteristic properties.

That is, the above polyethylene terephthalate resin (A) is characterized in that (1) the main recurring unit is ethylene terephthalate, (2) 85 mol % or more of terephthalic acid is contained as a dicarboxylic acid component and (3) 85 mol % or more of ethylene glycol and 1.0 to 5.0 mol % of diethylene glycol are contained as glycol components, (4) the total of the concentration of a terminal methyl ester group and the concentration of a terminal carboxyl group is 30 eq/$10^6$ g or less, and (5) the bulk density of the chip of the resin (A) is 0.83 to 0.97 g/cm$^3$. Meanwhile, the above polyethylene naphthalate resin (B) is characterized in that (1) the main recurring unit is ethylene-2,6-naphthalenedicarboxylate, (2) 85 mol % or more of 2,6-naphthalenedicarboxylic acid is contained as a dicarboxylic acid component and (3) 85 mol % of ethylene glycol and 1.0 to 5.0 mol % of diethylene glycol are contained as glycol components, (4) the total of the concentration of a terminal methyl ester group and the concentration of a terminal carboxyl group is 30 eq/$10^6$ g or less, and (5) the bulk density of the chip of the resin (B) is 0.83 to 0.97 g/cm$^3$.

DISCLOSURE OF THE INVENTION

It is an object of the present invention to provide an aromatic polyester composition comprising an ethylene naphthalenedicarboxylate copolymer and an ethylene terephthalate (co) polymer.

It is another object of the present invention to provide an aromatic polyester composition having excellent compatibility, transparency, heat resistance and gas barrier properties.

It is still another object of the present invention to provide molded products such as a bottle which are formed of the above aromatic polyester composition of the present invention and have excellent properties.

It is a further object of the present invention to provide a process for producing a bottle having excellent properties without impairing the excellent properties of the above aromatic polyester composition of the present invention.

Other objects and advantages of the present invention will become apparent from the following description.

According to the present invention, firstly, the above objects and advantages of the present invention are attained by an aromatic polyester composition comprising:

(A) (a) an ethylene naphthalenedicarboxylate copolymer which contains an ethylene naphthalenedicarboxylate unit in an amount of 94 to 80 mol % based on the total of all the recurring units and an ethylene terephthalate units and/or an ethylene isophthalate unit in an amount of 6 to 20 mol % based on the total of all the recurring units and a diethylene glycol unit in an amount of 0.8 to 2.5 wt % and has a number of terminal carboxyl groups of 40 eq/$10^6$ g or less and a total number of terminal groups of 95 eq/$10^6$ g or more, and (b) an ethylene terephthalate (co)polymer which contains an ethylene terephthalate unit in an amount of 100 to 80 mol % based on the total of all the recurring units and an ethylene naphthalenedicarboxylate unit and/or an ethylene isophthalate unit in an amount of 0 to 20 mol % based on the total of all the recurring units and a diethylene glycol unit in an amount of 1.2 to 2.4 wt % and which has a number of terminal carboxyl groups of 30 eq/$10^6$ g or less, an intrinsic viscosity of 0.7 or more and a melting temperature of 250° C. or less, the contents of the ethylene naphthalenedicarboxylate copolymer and the ethylene terephthalate (co)polymer being 5 to 95 wt % and 95 to 5 wt % based on the total weight of these, respectively;

(B) compatibility between the ethylene naphthalenedicarboxylate copolymer and the ethylene terephthalate (co) polymer being 0.15 to 0.5; and (C) the relationship represented by the following expression (1) being satisfied when the proportion of the ethylene naphthalenedicarboxylate unit to the total of all the recurring units of the ethylene naphthalenedicarboxylate copolymer and all the recurring units of the ethylene terephthalate (co)polymer is 50 mol % or less:

$$Tm \leq 254 - 28 \times EN \quad (1)$$

wherein EN is the molar fraction of the ethylene naphthalenedicarboxylate unit in the polyester composition and Tm is the melting point (° C.) of the polyester composition, and the relationship represented by the following expression (2) being satisfied when the proportion of the ethylene naphthalenedicarboxylate unit to the total of all the recurring units of the ethylene naphthalenedicarboxylate copolymer and all the recurring units of the ethylene terephthalate (co)polymer is more than 50 mol %:

$$Tm \leq 267 - 54 \times EN \quad (2)$$

wherein Tm and EN are the same as defined in the above expression (1).

According to the present invention, secondly, the above objects and advantages of the present invention are attained by molded products, such as a bottle, of the above aromatic polyester composition of the present invention.

According to the present invention, thirdly, the above objects and advantages of the present invention are attained by a bottle production process comprising the steps of:

melt-kneading the ethylene naphthalenedicarboxylate copolymer (a) and the ethylene terephthalate (co)polymer (b) specified by the above aromatic polyester composition in amounts of 5 to 95 wt % and 95 to 5 wt % based on the total weight of these, respectively, under injection molding conditions comprising a molding temperature of 275 to 325° C., a residence time of 80 to 230 sec, a plasticating time of 5 to 40 sec and a shear rate of 50 to 200 sec$^{-1}$ to form a preform and then blow-molding the preform under blow-molding conditions comprising a molding temperature of 80 to 160° C., a blow pressure of 25 to 40 kgf/cm$^2$ and a mold contact time of 5 to 20 sec.

DETAILED DESCRIPTION OF THE EMBODIMENT

The present invention will be described in detail hereunder. A detailed description is first given of the aromatic polyester composition of the present invention.

The aromatic polyester composition of the present invention comprises 5 to 95 wt % of an ethylene naphthalenedicarboxylate copolymer (a) and 95 to 5 wt % of an ethylene terephthalate (co)polymer (b) based on the total weight of these.

The ethylene naphthalenedicarboxylate copolymer (a) contains an ethylene naphthalenedicarboxylate unit in an amount of 94 to 80 mol % based on the total of all the recurring units. The remaining 6 to 20 mol % consists of an ethylene terephthalate unit and/or an ethylene isophthalate unit. When the ethylene terephthalate unit and/or the ethylene isophthalate unit are/is copolymerized in an amount of more than 20 mol %, the crystallinity of the obtained aromatic polyester lowers, thereby deteriorating handling properties, heat resistance and gas barrier properties.

The ethylene naphthalenedicarboxylate copolymer (a) contains ethylene glycol as a main glycol component and 0.8 to 2.5 wt % of a diethylene glycol unit. When the content of the diethylene glycol unit is larger than 2.5 wt %, the non-crystallinity of the obtained polyester becomes high, so that fusion bonding at the time of drying causes a problem. When the content is smaller than 0.8 wt %, the toughness of the obtained polyester becomes low, whereby the polyester is easily cracked and its handling properties deteriorate. The diethylene glycol unit is preferably contained in an amount of 0.8 to 1.2 wt %.

The ethylene naphthalenedicarboxylate copolymer (a) preferably has a number of terminal carboxyl groups of 40 eq/ton or less, more preferably 30 eq/ton or less. When the number of terminal carboxyl groups is more than 40 eq/ton, the compatibilizing rate slows down when the copolymer (a) is blended with polyethylene terephthalate whose main recurring unit is ethylene terephthalate.

The ethylene naphthalenedicarboxylate copolymer (a) preferably has a total number of terminal groups of 95 eq/ton or more, more preferably 105 eq/ton or more, particularly preferably 120 eq/ton or more. To improve the compatibility when the ethylene terephthalate whose main recurring unit is ethylene terephthalate, is blended with the (co)polymer (b), an ester interchange reaction between the ethylene naphthalenedicarboxylate copolymer (a) and the ethylene terephthalate (co)polymer (b) must proceed. When the total number of terminal groups is less than 95 eq/ton, the chances of terminal groups' contribution to the ester interchange reaction are reduced, thereby delaying the ester interchange reaction and reducing the compatibilization rate disadvantageously. The total number of terminal groups of the ethylene naphthalenedicarboxylate copolymer (a) is obtained from the following equation.

$$\text{total number of terminal groups} = 2 \times 10^6 / (DP \times 244.2 + 62.1)$$

wherein DP is the polymerization degree of the ethylene naphthalenedicarboxylate copolymer (a) and calculated from the following equation.

$$DP = (3.8 \times 10^4 IV^{1.18} - 62.1) / 242.2$$

wherein IV is the intrinsic viscosity of the ethylene naphthalenedicarboxylate copolymer (a).

The ethylene terephthalate (co)polymer (b), which is the other component of the aromatic polyester composition of the present invention, contains an ethylene terephthalate unit in an amount of 100 to 80 mol %, preferably 100 to 90 mol %, based on the total of all the recurring units. The remaining 0 to 20 mol %, preferably 0 to 10 mol % consists of an ethylene naphthalenedicarboxylate unit and/or an ethylene isophthalate unit. When the ethylene terephthalate unit is contained in an amount of 100 mol % based on the total of all the recurring units, the ethylene terephthalate (co)polymer is an ethylene terephthalate polymer (homopolymer). When the ethylene naphthalenedicarboxylate unit and/or the ethylene isophthalate unit are/is copolymerized in an amount of more than 20 mol %, the crystallinity of the obtained aromatic polyester lowers, so that fusion bonding at the time of drying becomes prominent and its handling properties deteriorate.

The ethylene terephthalate (co)polymer (b) contains ethylene glycol as a main glycol component and 1.2 to 2.4 wt % of a diethylene glycol unit. When the content of the diethylene glycol unit is smaller than 1.2 wt %, the melt flowability of the obtained polyester lowers with the result of poor moldability, while when the content is larger than 2.4 wt %, the finally obtained molded product such as a bottle has low strength.

The number of terminal carboxyl groups of the ethylene terephthalate (co)polymer (b) is 30 eq/10$^6$ g or less, preferably 25 eq/10$^6$ g or less. When the number is more than 30 eq/10$^6$ g, the main chain of the obtained polyester is cut by the terminal carboxyl group frequently disadvantageously.

The intrinsic viscosity of the ethylene terephthalate (co)polymer (b) is 0.7 or more. When the intrinsic viscosity is lower than 0.7, bottle moldability lowers. The intrinsic viscosity is calculated from a value measured at 35° C. in a mixed solvent of tetrachloroethane and phenol (weigh ratio of 4:6).

Further, the melting temperature (corresponding to crystalline melting temperature measured by a differential scanning calorimeter, temperature elevation rate of 20° C./min) of the ethylene terephthalate (co)polymer (b) is 250° C. or less, preferably 244° C. or less. When the melting temperature is higher than 250° C., the start of melting of the ethylene terephthalate (co)polymer (b) when it is compatibilized with the ethylene naphthalenedicarboxylate copolymer (a) is delayed and a compatilization reaction time becomes too long.

Unlike a simple blend of the ethylene naphthalenedicarboxylate copolymer (a) and the ethylene terephthalate (co)polymer (b), a bond is formed between these components (a) and (b) in the aromatic polyester composition of the present invention in limits that the compatibility between these components (a) and (b) which is defined by the following equation is 0.15 to 0.5.

$$\text{compatibility} = P_{NT} + P_{TN}$$

wherein $P_{NT}$ is the exisitential probability of a QA unit adjacent to a TA unit and obtained from the following equation:

$$P_{NT} = (I_{TEN}/2)/(I_{TET} + (I_{TEN}/2))$$

$P_{TN}$ is the exisitential probability of the TA unit adjacent to the QA unit and obtained from the following equation:

$$P_{TN} = (I_{TEN}/2)/(I_{NEN} + (I_{TEN}/2))$$

wherein $I_{TET}$ is the integral strength of hydrogen on EG in a TA-EG-TA unit (measured by NMR), $I_{NEN}$ is the integral strength of hydrogen on EG in a QA-EG-QA unit (measured by NMR), and $I_{TEN}$ is the integral strength of hydrogen on EG in a QA-EG-TA unit (measured by NMR).

QA is a naphthalenedicarboxylic acid unit, TA is a terephthalic acid unit and EG is an ethylene glycol unit.

The compatibility defined by the above equation is 0.15 to 0.50 as described above, preferably 0.2 to 0.40. When the compatibility is smaller than 0.15, the compatibilization between the ethylene naphthalenedicarboxylate copolymer and the ethylene terephthalate (co)polymer becomes insufficient and the transparency of the obtained composition is impaired, while when the compatibility is larger than 0.50, the non-crystallinity of the obtained composition increases, so that the mechanical strength thereof lowers.

Further, the melting point (Tm, ° C.) of the aromatic polyester composition of the present invention depends on the proportion of the ethylene naphthalenedicarboxylate unit contained in the composition and satisfies either one of the following relationships.

(i) When the proportion of the ethylene naphthalenedicarboxylate unit to the total of all the recurring units of the ethylene naphthalenedicarboxylate copolymer and all the recurring units of the ethylene terephthalate (co)polymer is 50 mol % or less, the following equation (1) is satisfied:

$$Tm \leq 254 - 28 \times EN \tag{1}$$

wherein EN is the molar fraction of the ethylene naphthalenedicarboxylate unit in the polyester composition and Tm is the same as defined above.

(ii) When the proportion of the ethylene naphthalenedicarboxylate unit to the total of all the recurring units of the ethylene naphthalenedicarboxylate copolymer and all the recurring units of the ethylene terephthalate (co)polymer is larger than 50 mol %, the following equation (2) is satisfied:

$$Tm \leq 267 - 54 \times EN \tag{2}$$

wherein Tm and EN are the same as defined in the above equation (1).

When the equation (1) is not satisfied in the case of (i) or when the equation (2) is not satisfied in the case of (ii), even if the compatibility is in the range of 0.15 to 0.5, the compatibilization between the ethylene naphthalenedicarboxylate copolymer (a) and the ethylene terephthalate (co)polymer (b) is unsatisfactory and transparency is impaired.

For the sake of convenience, according to the composition of recurring units forming the aromatic polyester composition of the present invention, the aromatic polyester composition can be divided into (I) a composition comprising 5 to 50 wt % of an ethylene naphthalenedicarboxylate copolymer and 95 to 50 wt % of an ethylene terephthalate (co)polymer based on the total weight of these, and (II) a composition comprising more than 50 wt % and 95 wt % or less of an ethylene naphthalenedicarboxylate copolymer and less than 50 wt % and 5 wt % or more of an ethylene terephthalate (co)polymer based on the total weight of these.

The above composition (I) can be considered as a composition for completing or reinforcing the properties of the ethylene terephthalate (co)polymer with the ethylene naphthalenedicarboxylate copolymer whereas the above composition (II) can be considered as a composition not only for completing or reinforcing the properties of the ethylene naphthalenedicarboxylate copolymer with the ethylene terephthalate (co)polymer but also for reducing a cost for producing.

The ethylene naphthalenedicarboxylate copolymer (a) in the present invention can be produced by either a direct esterification method or an ester interchange method. The ester interchange reaction catalyst and polycondensation catalyst used are not particularly limited. Metal compounds which are widely known as ester interchange reaction catalysts and polycondensation catalysts for polyethylene terephthalate are used as the catalysts. Illustrative examples of the ester interchange reaction catalyst include manganese compounds, calcium compounds, magnesium compounds, titanium compounds, zinc compounds, sodium compounds, potassium compounds, cerium compounds, lithium compounds and the like. A cobalt compound which functions as a color control agent may be added according to circumstances. Illustrative examples of the polycondensation catalyst include germanium compounds, antimony compounds and the like.

A phosphorus compound is preferably contained as a stabilizer in the ethylene naphthalenedicarboxylate copolymer (a) produced by the ester interchange method and/or direct esterification method. Illustrative examples of the phosphorus compound include phosphoric acid, phosphorous acid, phosphoric esters and triphosphoric esters.

The ethylene naphthalenedicarboxylate copolymer (a) in the present invention is preferably heated or solid-phase polymerized at a temperature of at least 150° C. The amount of acetaldehyde contained in the copolymer is thereby reduced to preferably 20 ppm or less, more preferably 10 ppm or less.

When the aromatic polyester composition of the present invention is used in a food container or the like, if the amount of acetaldehyde contained is large, the flavor of the contents is impaired. The content of acetaldehyde can be reduced by heat treatment or solid-phase polymerization conducted at 150° C. or higher. When the heat treatment temperature is lower than 150° C., the amount of acetaldehyde scattered is small and a long-time heat treatment is required, which is economically disadvantageous. When the heat treatment temperature is higher than 210° C. or solid-phase polymerization is carried out at a temperature higher than 245° C., the content of acetaldehyde decreases advantageously, while this high temperature, at the same time, causes a reduction in molecular weight and the deterioration of a polymer such as coloration.

The ethylene naphthalenedicarboxylate copolymer (a) may contain such additives as an antioxidant, ultraviolet absorber, antistatic agent and the like as required.

The ethylene terephthalate (co)polymer (b) in the present invention can be produced by either a direct esterification method or an ester interchange method. The ester interchange reaction catalyst used in the ester interchange method is not particularly limited. Metal compounds which are widely known as catalysts for polyesters, such as manganese compounds, calcium compounds, magnesium compounds, titanium compounds, zinc compounds, sodium compounds, potassium compounds, cerium compounds, lithium compounds and the like, are used as the ester interchange reaction catalyst. A cobalt compound which functions as a color control agent may be added according to circumstances.

An antimony compound and/or a germanium compound are/is preferably used as a polycondensation catalyst in the present invention in an amount which satisfies the following equation:

$$40 \leq (Sb+Ge) \leq 250$$

wherein Sb and Ge are the amounts of antimony and germanium contained in the polyethylene terephthalate, respectively, and "ppm" is used as the unit thereof.

When the amount of the polycondensation catalyst is smaller than 40 ppm, the compatibilizing rate becomes low when the ethylene terephthalate (co)polymer (b) is blended with the ethylene naphthalenedicarboxylate copolymer (a). On the other hand, when the polycondensation catalyst is contained in an amount of more than 250 ppm, the compatibilizing rate becomes high at the time of blending but a decomposition reaction proceeds, whereby a reduction in the molecular weight of the obtained polyester composition and the deterioration of the polymer such as coloration become prominent.

A phosphorus compound is preferably contained as a stabilizer in the ethylene terephthalate (co)polymer (b) produced by the ester interchange method and/or direct esterification method and is selected from phosphoric acid, phosphorous acid, phosphoric esters and triphosphoric esters.

The amount of acetaldehyde contained in the ethylene terephthalate (co)polymer (b) in the present invention is preferably 3 ppm or less. When acetaldehyde is contained in an amount of more than 3 ppm and the obtained polyester composition is used in a food container or the like, the flavor of the contents is impaired.

The crystallinity of the ethylene terephthalate (co) polymer (b) in the present invention is preferably 60% or less, more preferably 58% or less. The crystallinity is calculated based on the density of the polymer from the following equation:

$$crystallinity = 1.455 \times (\rho - 1.335)/(0.120 \times \rho)$$

wherein $\rho$ is the density of the ethylene terephthalate (co)polymer in the present invention.

When the crystallinity is higher than 60%, it takes time to melt the polymer and the compatibilizing rate becomes low when the ethylene terephthalate (co)polymer (b) is blended with the ethylene naphthalenedicarboxylate copolymer (a).

The ethylene terephthalate (co)polymer (b) is preferably solid-phase polymerized at 220° C. or less for 5 hours or longer. When the solid-phase polymerization temperature is higher than 220° C., the melting point of the ethylene terephthalate (co)polymer may exceed 250° C., the crystallinity may exceed 60%, or fusion bonding may occur disadvantageously if the amount of the ethylene terephthalate (co)polymer is large. When the solid-phase polymerization time is less than 5 hours, the amount of acetaldehyde contained in the ethylene terephthalate (co)polymer is not fully reduced disadvantageously.

The ethylene terephthalate (co)polymer (b) may contain such additives as an antioxidant, ultraviolet absorber and antistatic agent as required.

To produce the aromatic polyester composition of the present invention by blending the ethylene naphthalenedicarboxylate copolymer (a) with the ethylene terephthalate (co)polymer (b), the particle (pellet) sizes of the polymers are preferably controlled as follows.

The pellet size of the ethylene naphthalenedicarboxylate copolymer (a) is preferably such that 90 wt % or more of all the pellets pass through an ASTM-based 4-mesh sieve but not a 10-mesh sieve. When large-sized pellets which are too large to pass through a 4-mesh sieve or small-sized pellets which are so small that they pass through a 10-mesh sieve are existent in an amount of more than 10 wt % of the total of all the pellets, there are differences in residence time at the time of blending the ethylene naphthalenedicarboxylate copolymer (a) with the polyethylene terephthalate (co) polymer (b), small-sized pellets are affected by heat deterioration because they are easily molten, and large-sized pellets slow down the compatibilizing rate because they are blended with the ethylene terephthalate (co)polymer (b) without being completely molten.

Similarly, the pellet size of the ethylene terephthalate (co)polymer (b) is preferably such that 90 wt % or more of all the pellets pass through an ASTM-based 4-mesh sieve but not a 10-mesh sieve. When large-sized pellets which are too large to pass through a 4-mesh sieve or small-sized pellets which are so small that they pass through a 10-mesh sieve are existent in an amount of more than 10 wt % of the total of all the pellets, there are differences in residence time at the time of blending the ethylene terephthalate (co) polymer (b) with the ethylene naphthalenedicarboxylate copolymer (a), small-sized pellets are affected by heat deterioration because they are easily molten, and large-sized pellets slow down the compatibilizing rate because they are blended with the ethylene naphthalenedicarboxylate copolymer (a) without being completely molten.

The aromatic polyester composition of the present invention preferably contains at least one of either antimony or germanium and phosphorus in amounts which satisfy the following expressions (3) and (4):

$$53 \leq 1/2Sb + Ge \leq 150 \tag{3}$$

$$25 \leq P \leq 70 \tag{4}$$

wherein each element symbol represents the content (ppm) of each element in the polyester composition.

When the total amount of germanium and antimony ($(1/2)Sb+Ge$) contained in the polyester composition is smaller than 53 ppm, the compatibilizing rate between the ethylene naphthalenedicarboxylate copolymer (a) and the ethylene terephthalate (co)polymer (b) becomes low, while when the total amount is larger than 150 ppm, the decomposition rate becomes high, the amount of acetaldehyde regenerated becomes large and the intrinsic viscosity greatly lowers disadvantageously.

When the amount of phosphorus is smaller than 25 ppm or larger than 70 ppm, the thermal stability of the polyester composition deteriorates disadvantageously.

The aromatic polyester composition of the present invention preferably has a haze value of 3% or less, more preferably 2% or less. When the haze value is larger than 3%, transparency deteriorates and the appearance of a molded product of the obtained aromatic polyester composition is bad.

The aromatic polyester composition of the present invention can be formed into various molded products such as containers for foods and drinks, hollow molded products, preforms, collection container for blood samples, medical containers, cosmetic containers, films and sheets, by making use of its excellent transparency, heat resistance, gas barrier properties or moldability.

Of molded products produced from the aromatic polyester composition of the present invention, bottles are often used for containing materials which directly come into contact with the human body, such as juice, carbonated drinks, water, oil, seasonings, alcohols and cosmetics. Therefore, it is desirable that the amount of acetaldehyde scattered into the space of a bottle be as small as possible.

The amount of acetaldehyde scattered into the bottle of the present invention is preferably 10 $\mu$g/l·day or less, more preferably 6 $\mu$g/l·day or less. When the amount of acetaldehyde is larger than 10 $\mu$g/l·day, the flavor of the contents is deteriorated by the unpleasant odor of the bottle. In the present invention, the amount of acetaldehyde scattered is the amount ($\mu$g/l·day) of acetaldehyde scattered into the bottle purged with nitrogen. This is calculated by measuring the concentration of acetaldehyde contained in the gas of the bottle by gas chromatography, after the bottle is left in the air for 1 hour after molded, the gas in the bottle is purged with nitrogen, the bottle is stoppered tight and maintained at 25° C. for 24 hours.

The excellent barrier properties of the bottle of the present invention can be evaluated using the amount of xylene adsorbed to the bottle as an index.

The amount of xylene adsorbed to the bottle of the present invention is preferably 100 ppm or less. When the amount is larger than 100 ppm, the barrier properties of the bottle lower disadvantageously. The amount of xylene adsorbed is calculated as follows. That is, the bottle is filled with xylene and maintained at 25° C. for two weeks, xylene is removed from the bottle, the bottle is washed with water, and its barrel portion is cut out to measure the amount of xylene by gas chromatography. The amount of xylene adsorbed is an index for evaluating the barrier properties of an organic solvent.

The molded product of the present invention preferably has an average density of 1.34 to 1.40 g/cm$^3$, more preferably 1.36 to 1.40 g/cm$^3$. When the average density is lower than 1.34 g/cm$^3$, the heat resistance of the molded product becomes too low, while when the average density is higher than 1.40 g/cm$^3$, the productivity of the molded product lowers.

Further, the molded product of the present invention preferably has a hydrothermal shrinkage at 90° C. of 1% or less. When the hydrothermal shrinkage is larger than 1%, the molded product is given a bad appearance by heat shrinkage.

The hydrothermal shrinkage of a molded product is calculated from the following equation by measuring the capacity of the molded product before and after a heat treatment which comprises filling hot water into the molded product and cooling it immediately.

hydrothermal shrinkage (%)=100×(capacity before heat treatment−capacity after heat treatment)/(capacity before heat treatment)

In the above heat treatment, "filling hot water" means a treatment that the molded product is filled with water of 90° C., stoppered tight and maintained at 25° C. for 3 minutes and "cooling" means a treatment that the molded product is cooled with running water of 25° C.

According to the present invention, when the molded product of the present invention is a bottle, the following process is provided as the production process therefor.

That is, a bottle production process is provided that comprises the steps of melt-kneading the ethylene naphthalenedicarboxylate copolymer (a) and the ethylene terephthalate (co)polymer (b) already specified in the present invention in amounts of 5 to 95 wt % and 95 to 5 wt % based on the total weight of these, respectively, under injection molding conditions comprising a molding temperature of 275 to 325° C., a residence time of 80 to 230 sec, a plasticating time of 5 to 40 sec and a shear rate of 50 to 200 sec$^{-1}$ to form a preform and then blow-molding the preform under blow-molding conditions comprising a molding temperature of 80 to 160° C., a blow pressure of 25 to 40 kgf/cm$^2$ and a mold contact time of 5 to 20 sec.

The ethylene naphthalenedicarboxylate copolymer (a) and the ethylene terephthalate (co)polymer (b) are polymers having characteristic properties described above.

The bottle production process of the present invention comprises the step of forming a preform and the step of blow-molding the preform to form a bottle.

The step of forming a preform is conducted by melt-kneading the ethylene naphthalenedicarboxylate copolymer (a) and the ethylene terephthalate (co)polymer (b) under the injection molding conditions specified above.

When the molding temperature is outside the above range of 275 to 325° C. or the residence time is outside the above range of 80 to 230 sec, compatibility between the ethylene naphthalenedicarboxylate copolymer (a) and the ethylene terephthalate (co)polymer (b) is unsatisfactory and the transparency of the obtained preform deteriorates, or compatibilization between the polymers (a) and (b) proceeds too far and the heat resistance and mechanical strength of the obtained preform deteriorate.

When the plasticating time is shorter than 5 sec, compatibilization between the polymers is insufficient, while when the plasticating time is longer than 40 sec, productivity lowers.

Further, when the shear rate is lower than 50 sec$^{-1}$, kneading becomes insufficient, while when the shear rate is higher than 200 sec$^1$, the quantity of heat generated by shearing becomes large and temperature control becomes almost impossible.

Each of the ethylene naphthalenedicarboxylate copolymer (a) and the ethylene terephthalate (co)polymer (b) is preferably in the form of chips 90 wt % or more of which pass through an ASTM-based 4-mesh sieve but not a 10-mesh sieve at the time of melt kneading.

The ratio (L/D) of the length L to the diameter D of the screw of a molding machine for injection molding the preform is preferably in the range of 18 to 35, more preferably 20 to 30. When the ratio is smaller than 18, the residence time is too short and it is difficult to secure the transparency of the preform disadvantageously. When the ratio is larger than 35, the residence time is too long and quality deterioration is large, thereby causing a reduction in intrinsic viscosity, an increase in the amount of acetaldehyde and the debasement of color.

When the ethylene naphthalenedicarboxylate copolymer (a) and the ethylene terephthalate (co)polymer (b) are melt-kneaded together, the relationship represented by the following expression (5) is preferably established between them:

$$k \geq 1.644 \times 10^3 \times \exp(-4.678 \times 10^3/T) \quad (5)$$

wherein k is a compatibilizing rate defined by the following equation:

$k = \{100\% - (\text{haze value (\%) of blend obtained after melt kneading})\}/\text{residence time (sec) at the time of melt kneading}$ (haze value is for a 300 μm-thick film of the blend and T is a melt kneading temperature (° K)).

The above compatibilizing rate varies according to a melt kneading apparatus used. In the present invention, it is the compatibilizing rate of a single-screw or twin-screw extruder having a ratio (L/D) of the length L to the diameter D of the screw of 18 to 35, film forming machine or injection molding machine.

The relationship of the above expression (5) is more preferably represented by the expression (5)-1:

$$k \geq 1.918 \times 10^2 \times \exp(-3.4328 \times 10^3/T) \quad (5)\text{-}1$$

wherein k and T are the same as defined in the above expression (5), particularly preferably the expression (5)-2:

$$k \geq 5.559 \times \exp(-1.437 \times 10^3/T) \quad (5)\text{-}2$$

wherein k and T are the same as defined in the above expression (5).

Further, when the ethylene naphthalenedicarboxylate copolymer (a) and the ethylene terephthalate (co)polymer (b) are to be melt kneaded to form a preform, they are preferably at a pressure of 10 Torr or less by sucking at least while they are molten. Since the compatibilizing rate is accelerated by suction, the molding temperature at this point is preferably 260 to 310° C.

The polymers which are molten in the plasticating zone or metering zone of a molding machine are subjected to the suction. When the pressure is higher than 10 Torr, the compatibilizing rate between the polymers (a) and (b) becomes low, the acetaldehyde originally contained in the polymers (a) and (b) and the acetaldehyde regenerated in the molding step are apt to remain in the polymers excessively, whereby the flavor retainability of the bottle is apt to be suppressed.

The step of blow-molding the preform is carried out under the above specified blow-molding conditions.

By carrying out blow-molding under the above conditions, a bottle having excellent heat resistance, strength and transparency can be obtained.

The following examples are given to further illustrate the present invention. "Parts by weight" may be expressed as "parts".

(1) Intrinsic Viscosity (IV)

This is calculated from a value measured at 35° C. in a mixed solvent of tetrachloroethane and phenol (weight ratio of 4:6).

(2) Moldability

A preform is formed with the M100DM molding machine of Meiki Manufacturing Co., Ltd. Moldability is evaluated based on a molding temperature and a residence time when a transparent reform is obtained. "Good moldability" indicates that the transparent preform can be formed at low temperatures for a short residence time.

A bottle is molded with the LB01 of Krupp Corpoplast Maschinonbau GmbH.

(3) Terminal Carboxyl Group

A sample is dissolved in a benzyl alcohol, a phenol red indicator is added to the obtained solution, and the sample is neutralized by the titration of sodium hydroxide.

(4) Melting Point

The crystalline melting temperatures of the ethylene terephthalate (co)polymer and the ethylene naphthalenedicarboxylate copolymer measured with a differential scanning calorimeter (DSC) at a temperature elevation rate of 20° C./min are taken as the melting points of the polymers.

The melting points of a bottle (a sample cut out from the mouth portion of a bottle is used) and a composition are measured with a differential scanning calorimeter (DSC) at a temperature elevation rate of 5° C./min.

(5) Haze

The haze of the barrel portion of a bottle is measured with a turbidimeter of Nippon Denshoku Kogyo Co., Ltd. A sample has a thickness of 300 μm.

(6) Amount of Diethylene Glycol (May be Abbreviated as DEG Hereinafter)

A sample is decomposed with hydrazine and measured by gas chromatography.

(7) Compatibility

The integral intensity of each hydrogen forming ethylene glycol is measured by 600-MHz NMR and compatibility is calculated from the following equation. compatibility=$P_{NT}$+$P_{TN}$ wherein $P_{NT}$ and $P_{TN}$ are the same as defined above.

(8) Ultraviolet Screening Properties

The transmittance for each wavelength of a 300-μm-thick sample obtained by cutting out the barrel portion of a bottle is measured with an ultraviolet and visible spectophotometer, and the longest wavelength out of wavelengths having a transmittance of 0% is taken as an ultraviolet cut wavelength (UV cut wavelength in the tables).

(9) Buckling Strength (Mechanical Strength)

A load is applied to a 0.5-liter bottle by a load cell at a rate of 50 mm/min, and a load when the bottle is buckled is measured.

(10) Total Number of Terminal Groups

This is calculated from the value of the intrinsic viscosity obtained by the above measuring method.

(11) Content of Acetaldehyde

After a sample is frozen and milled, the content of acetaldehyde in the sample is measured by gas chromatography (HS-GC of Hitachi, Ltd.).

(12) Crystallinity (May be Abbreviated as Xc)

This is obtained by measuring the density (d) of the polymer with a calcium nitrate density gradient tube. In the case of the ethylene terephthalate (co)polymer, it is calculated from the following equation.

$Xc = \{1.455 \times (d-1.335)\}/(d \times 0.12) \times 100 (\%)$

(13) Amount of Acetaldehyde Scattered (Flavor Retainability)

After a 1.5-liter bottle is left in the air for 1 hour after molded, the bottle is purged with nitrogen and stoppered tight. The bottle is maintained in this state at 25° C. for 24 hours and the concentration of acetaldehyde in the gas of the bottle is measured by gas chromatography.

(14) Gas Barrier Properties

After a 1.5-liter bottle is filled with xylene and maintained at 25° C. for two weeks, xylene is removed from the bottle, the bottle is washed with water, the barrel portion of the bottle is cut out, and the amount of xylene contained in the barrel portion is measured by gas chromatography.

(15) Hydrothermal Shrinkage

The hydrothermal shrinkage of a bottle is calculated from the following equation by measuring the capacity of the bottle before and after a heat treatment which comprises filling hot water into the bottle and cooling it immediately.

hydrothermal shrinkage (%)=100×(capacity before heat treatment−capacity after heat treatment)/(capacity before heat treatment)

In the heat treatment, the bottle is filled with water of 90° C., stoppered tight and maintained in this state at 25° C. for three minutes, and then cooled with running water of 25° C.

(16) Heat Resistance

A heat treatment is carried out that comprises filling a hollow container with hot water of 90° C., stoppering it tight, maintaining it for 3 minutes and cooling it with running water. A change in the capacity of the hollow container before and after the heat treatment is measured.

(17) Average Density of Barrel Portion of Hollow Container

A sample is cut out from the barrel portion of a hollow container and the density of the sample is measured with a calcium nitrate density gradient tube.

Reference Example 1

Eighty eight parts of dimethyl 2,6-naphthalenedicarboxylate, 9.6 parts of dimethyl terephthalate and 51 parts of ethylene glycol (may be abbreviated as EG hereinafter) were subjected to an ester interchange reaction in accordance with a commonly used method using 0.01 part of cobalt acetate tetrahydrate and 0.03 part of manganese acetate tetrahydrate as ester interchange catalysts. Thereafter, 1.0 part of a 2.74%-EG solution of antimony trioxide was added, and then 0.54 part of a 4.3%-EG solution of trimethyl phosphate was added to terminate the ester interchange reaction.

Thereafter, a polycondensation reaction was carried out in accordance with a commonly used method at a high temperature and a high degree of vacuum for 60 minutes, and then the obtained product was formed into a strand chip. The obtained chip polymer (to be referred to as "PENS1" hereinafter) had an intrinsic viscosity of 0.44. Details are shown in Table 1.

Reference Examples 2 to 8

Chip polymers (to be referred to as "PEN2 to PEN8" hereinafter) shown in Table 1 were obtained in the same manner as in Reference Example 1. Details are shown in Table 1.

TABLE 1

| reference example | polymer | amount of ethylene terephthalate unit copolymerized (mol %) | intrinsic viscosity | total number of all terminal groups (eq/T) | number of COOH terminals (eq/T) | amount of DEG (wt %) | 4~10-mesh sieves (wt %) | amount of Sb (ppm) | amount of Ge (ppm) | amount of P (ppm) | amount of acetaldehyde (ppm) |
|---|---|---|---|---|---|---|---|---|---|---|---|
| 1 | PEN-1 | 12 | 0.44 | 138 | 21 | 0.9 | 93 | 200 | — | 45 | 10 |
| 2 | PEN-2 | 12 | 0.50 | 118 | 22 | 0.9 | 94 | 210 | — | 48 | 9 |
| 3 | PEN-3 | 8 | 0.38 | 164 | 15 | 0.9 | 91 | 200 | — | 41 | 15 |
| 4 | PEN-4 | 8 | 0.50 | 118 | 23 | 0.9 | 94 | 230 | — | 44 | 10 |
| 5 | PEN-5 | 7 | 0.56 | 103 | 24 | 1.5 | 95 | — | 130 | 85 | 5 |
| 6 | PEN-6 | 16 | 0.45 | 134 | 23 | 0.9 | 95 | 180 | — | 35 | 16 |
| 7 | PEN-7 | 2 | 0.62 | 84 | 45 | 3.0 | 83 | 150 | — | 40 | 80 |
| 8 | PEN-8 | 0 | 0.61 | 87 | 41 | 2.9 | 90 | — | 60 | 20 | 100 |

Reference Example 9

After 100 parts of terephthalic acid and 51 parts of ethylene glycol were esterified, 0.93 part of a 1%-EG solution of germanium was added, and then 0.42 part of a 4.3%-EG solution of trimethyl phosphate was added. A polycondensation reaction was carried out in accordance with a commonly used method at a high temperature and a high degree of vacuum and a strand chip polymer (to be referred to as "PET1" hereinafter) was obtained.

Reference Examples 10 to 16

Chip polymers (to be referred to as "PET2 to PET8" hereinafter) shown in Table 2 were obtained in the same manner as in Reference Example 9. Details are shown in Table 2.

TABLE 2

| reference example | polymer | intrinsic viscosity | amount of DEG (wt %) | 4~10-mesh sieves (wt %) | number of COOH terminals (eq/T) | melting temperature (° C.) | amount of Sb (ppm) | amount of Ge (ppm) | amount of P (ppm) | amount of acetaldehyde (ppm) |
|---|---|---|---|---|---|---|---|---|---|---|
| 9 | PET-1 | 0.85 | 1.8 | 95 | 15 | 243 | — | 80 | 36 | 0.9 |
| 10 | PET-2 | 0.80 | 1.7 | 94 | 18 | 241 | — | 73 | 34 | 1.5 |
| 11 | PET-3 | 0.83 | 1.8 | 95 | 13 | 248 | — | 50 | 23 | 1.1 |
| 12 | PET-4 | 0.88 | 2.3 | 96 | 15 | 240 | — | 60 | 26 | 1.2 |
| 13 | PET-5 | 0.76 | 1.3 | 95 | 12 | 248 | — | 60 | 26 | 1.9 |
| 14 | PET-6 | 0.78 | 1.7 | 95 | 16 | 246 | 150 | — | 23 | 1.7 |

TABLE 2-continued

| reference example | polymer | intrinsic viscosity | amount of DEG (wt %) | 4~10-mesh sieves (wt %) | number of COOH terminals (eq/T) | melting temperature (° C.) | amount of Sb (ppm) | amount of Ge (ppm) | amount of P (ppm) | amount of acetaldehyde (ppm) |
|---|---|---|---|---|---|---|---|---|---|---|
| 15 | PET-7 | 0.67 | 1.0 | 81 | 32 | 254 | — | 40 | 19 | 5.0 |
| 16 | PET-8 | 0.75 | 2.7 | 86 | 31 | 252 | — | 40 | 18 | 3.5 |

EXAMPLES 1 to 15

Comparative Examples 1 to 3

In Examples 1 to 14 and Comparative Examples 1 to 3, preforms were formed with the M100DM injection molding machine of Meiki Co., Ltd. under the conditions of Table 3 by blending the chip PEN polymers and PET polymers obtained in Reference Examples in blending ratios shown in Table 3. The obtained preforms were blow-molded with the LB01 blow-molding machine of Krupp Corpoplast Maschinonbau GmbH. at a molding temperature of 80 to 160° C. for 10 seconds to form bottles having an inner capacity of 1.5 liters and an average thickness of a barrel portion of 300 to 400 μm. In Comparative Examples 1 to 3, bottles were molded at a molding temperature of normal temperature.

In Example 15, PEN and PET polymers were melt-kneaded with a double-screw extruder at amolding temperature of 295° C. and pelletized. A bottle was molded in the same manner as described above. The moldability and physical properties of each of the above bottles are shown in Tables 3, 4 and 5.

TABLE 3

|  | type of PEN | type of PET | blending ratio (wt %) | intrinsic viscosity | compatibility | Tm (° C.) | haze (%) |
|---|---|---|---|---|---|---|---|
| Ex. 1 | PEN-3 | PET-1 | 10/90 | 0.675 | 0.21 | 248 | 0.8 |
| Ex. 2 | PEN-4 | PET-1 | 10/90 | 0.685 | 0.24 | 247 | 0.9 |
| Ex. 3 | PEN-1 | PET-1 | 10/90 | 0.680 | 0.24 | 247 | 0.9 |
| Ex. 4 | PEN-2 | PET-1 | 10/90 | 0.685 | 0.23 | 248 | 1.0 |
| Ex. 5 | PEN-5 | PET-1 | 10/90 | 0.690 | 0.18 | 249 | 0.8 |
| Ex. 6 | PEN-6 | PET-1 | 10/90 | 0.680 | 0.27 | 246 | 0.9 |
| Ex. 7 | PEN-1 | PET-2 | 10/90 | 0.642 | 0.22 | 248 | 0.9 |
| Ex. 8 | PEN-1 | PET-3 | 10/90 | 0.664 | 0.23 | 248 | 0.8 |
| Ex. 9 | PEN-1 | PET-4 | 10/90 | 0.702 | 0.22 | 246 | 0.8 |
| Ex. 10 | PEN-1 | PET-5 | 10/90 | 0.540 | 0.21 | 250 | 0.9 |
| Ex. 11 | PEN-1 | PET-1 | 20/80 | 0.645 | 0.24 | 242 | 1.0 |
| Ex. 12 | PEN-1 | PET-1 | 30/70 | 0.611 | 0.25 | 240 | 0.9 |
| Ex. 13 | PEN-1 | PET-1 | 40/60 | 0.576 | 0.26 | 237 | 0.9 |
| Ex. 14 | PEN-1 | PET-6 | 10/90 | 0.634 | 0.21 | 248 | 0.8 |
| Ex. 15 | PEN-1 | PET-1 | 10/90 | 0.670 | 0.28 | 246 | 0.9 |
| C. Ex. 1 | PEN-7 | PET-7 | 4/96 | 0.490 | 0.10 | 254 | 40 |
| C. Ex. 2 | PEN-8 | PET-8 | 2/98 | 0.496 | 0.55 | 250 | 3.5 |
| C. Ex. 3 | PEN-8 | PET-8 | 10/90 | 0.489 | 0.60 | 237 | 0.8 |

|  | amount of ½Sb + Ge (ppm) | amount of P (ppm) | UV cut wavelength (nm) | buckling strength (kg/cm²) | molding temperature (° C.) | residence time (sec) |
|---|---|---|---|---|---|---|
| Ex. 1 | 112 | 37 | 370 | 30 | 285 | 200 |
| Ex. 2 | 84 | 37 | 370 | 30 | 292 | 200 |
| Ex. 3 | 82 | 37 | 370 | 30 | 275 | 200 |
| Ex. 4 | 83 | 37 | 370 | 31 | 285 | 200 |
| Ex. 5 | 85 | 41 | 370 | 29 | 298 | 210 |
| Ex. 6 | 81 | 36 | 370 | 28 | 273 | 210 |
| Ex. 7 | 76 | 35 | 370 | 30 | 277 | 220 |
| Ex. 8 | 55 | 25 | 370 | 29 | 285 | 200 |
| Ex. 9 | 64 | 28 | 370 | 29 | 290 | 210 |
| EX. 10 | 64 | 28 | 370 | 31 | 290 | 220 |
| Ex. 11 | 84 | 38 | 372 | 27 | 274 | 210 |
| Ex. 12 | 86 | 39 | 373 | 25 | 273 | 200 |
| Ex. 13 | 88 | 40 | 374 | 25 | 272 | 200 |
| Ex. 14 | 78 | 25 | 370 | 28 | 280 | 210 |
| Ex. 15 | 81 | 34 | 370 | 27 | 285 | 135 |
| C. Ex. 1 | 41 | 20 | 365 | 18 | 320 | 250 |
| C. Ex. 2 | 41 | 18 | 362 | 20 | 330 | 270 |
| C. Ex. 3 | 41 | 18 | 362 | 20 | 325 | 270 |

Ex.: Example
C. Ex.: Comparative Example
*Although molding temperature was raised and residence time was extended in Comparative Examples 1 and 2, the obtained bottles had poor transparency, low moldability and unsatisfactory ultraviolet screening properties and buckling strength.

TABLE 4 barrier properties

|  | amount of xylene (ppm) |
|---|---|
| Example 3 | 90 |
| Example 11 | 60 |
| Example 12 | 40 |
| Example 13 | 25 |
| C.Ex. 1 | 140 |
| C.Ex. 2 | 145 |

C.Ex.: Comparative Example

TABLE 5

|  | average density of barrel portion of bottle (g/cm³) | heat resistance (hydrothermal shrinkage: %) |
|---|---|---|
| Ex. 1 to 10 and 15 | 1.370 | 0.7 |
| Ex. 11 and 12 | 1.368 | 0.6 |
| Ex. 13 | 1.366 | 0.5 |
| C.Ex. 1 | 1.356 | 3 |
| C.Ex. 2 | 1.357 | 3 |
| C.Ex. 3 | 1.355 | 2 |

Ex.: Example
C.Ex.: Comparative Example

EXAMPLES 16 to 32

Comparative Examples 4 to 6

In Examples 16 to 32 Comparative Examples 4 to 6, preforms were formed with the M100DM injection molding machine of Meiki Co., Ltd. (L/D=20) under the conditions of Table 6 by blending the chip PEN polymers and PET polymers obtained in Reference Examples in blending ratios shown in Table 6. The obtained preforms were blow-molded with the LB01 blow-molding machine of Krupp Corpoplast Maschinonbau GmbH. to form hollow containers having an inner capacity of 1.5 liters and an average thickness of a barrel portion of 250 to 350 μm. The preform forming conditions of Example 16 include a molding temperature of 289° C., a residence time of 180 sec., a plasticating time of 20 sec. and a shear rate of 110 sec$^{-1}$, and the blow-molding conditions thereof include a bottom molding temperature of 100° C., a barrel molding temperature of 130° C., a blow time of 7 sec. and a blow pressure of 35 kg/cm. A bottle was molded under the above conditions.

In Comparative Examples 4 to 6, bottles were molded at a molding temperature of normal temperature.

In Example 32, PEN and PET polymers were melt-kneaded with a double-screw extruder at a molding temperature of 295° C. and pelletized. A bottle was molded from the obtained pellets in the same manner as described above.

The moldability and physical properties of each of the above bottles are shown in Tables 6 and 7.

TABLE 6 physical properties of bottles

| | type of PEN | type of PET | blending ratio (wt %) | intrinsic viscosity | compatibility | compatibilizing rate (k) | Tm (° C.) | haze (%) |
|---|---|---|---|---|---|---|---|---|
| Ex. 16 | PEN-3 | PET-1 | 10/90 | 0.677 | 0.21 | 0.55 | 248 | 1.0 |
| Ex. 17 | PEN-4 | PET-1 | 10/90 | 0.690 | 0.24 | 0.51 | 247 | 0.9 |
| Ex. 18 | PEN-1 | PET-1 | 10/90 | 0.700 | 0.24 | 0.74 | 247 | 0.7 |
| Ex. 19 | PEN-2 | PET-1 | 10/90 | 0.690 | 0.23 | 0.57 | 248 | 0.9 |
| Ex. 20 | PEN-5 | PET-1 | 10/90 | 0.685 | 0.18 | 0.66 | 249 | 0.8 |
| Ex. 21 | PEN-6 | PET-1 | 10/90 | 0.675 | 0.27 | 0.43 | 246 | 0.9 |
| Ex. 22 | PEN-1 | PET-2 | 10/90 | 0.650 | 0.22 | 0.50 | 248 | 1.0 |
| Ex. 23 | PEN-1 | PET-3 | 10/90 | 0.673 | 0.23 | 0.58 | 248 | 0.7 |
| Ex. 24 | PEN-1 | PET-4 | 10/90 | 0.710 | 0.22 | 0.51 | 246 | 1.3 |
| Ex. 25 | PEN-1 | PET-5 | 10/90 | 0.535 | 0.21 | 0.44 | 250 | 1.1 |
| Ex. 26 | PEN-1 | PET-1 | 20/80 | 0.653 | 0.24 | 0.55 | 242 | 1.5 |
| Ex. 27 | PEN-1 | PET-1 | 30/70 | 0.607 | 0.25 | 0.50 | 240 | 0.9 |
| Ex. 28 | PEN-1 | PET-1 | 40/60 | 0.571 | 0.26 | 0.50 | 237 | 0.5 |
| Ex. 29 | PEN-5 | PET-1 | 60/40 | 0.575 | 0.30 | 0.55 | 237 | 1.6 |
| Ex. 30 | PEN-5 | PET-1 | 80/20 | 0.501 | 0.26 | 0.61 | 258 | 1.9 |
| Ex. 31 | PEN-1 | PET-6 | 10/90 | 0.624 | 0.21 | 0.62 | 248 | 0.8 |
| Ex. 32 | PEN-1 | PET-1 | 10/90 | 0.682 | 0.25 | 0.73 | 247 | 0.8 |
| C. Ex. 4 | PEN-7 | PET-7 | 4/96 | 0.485 | 0.10 | 0.36 | 254 | 10.6 |
| C. Ex. 5 | PEN-8 | PET-8 | 2/98 | 0.493 | 0.55 | 0.36 | 250 | 4.1 |
| C. Ex. 6 | PEN-8 | PET-8 | 10/90 | 0.472 | 0.60 | 0.40 | 237 | 1.2 |

| | amount of ½Sb + Ge (ppm) | amount of P (ppm) | UV cut wavelength (nm) | amount of acetaldehyde (μg/L · day) | buckling strength (kg/cm²) | molding temperature (° C.) | residence time (sec) | plasticating time (sec) | shear rate (sec$^{-1}$) |
|---|---|---|---|---|---|---|---|---|---|
| Ex. 16 | 110 | 36 | 370 | 6 | 30 | 289 | 180 | 20 | 110 |
| Ex. 17 | 83 | 34 | 370 | 6 | 29 | 291 | 195 | 23 | 110 |
| Ex. 18 | 81 | 37 | 370 | 5 | 30 | 295 | 135 | 12 | 170 |
| Ex. 19 | 82 | 35 | 370 | 5 | 30 | 290 | 175 | 18 | 160 |
| Ex. 20 | 81 | 40 | 370 | 9 | 29 | 305 | 150 | 16 | 150 |
| Ex. 21 | 80 | 32 | 370 | 4 | 25 | 272 | 230 | 33 | 100 |
| Ex. 22 | 74 | 33 | 370 | 5 | 31 | 280 | 200 | 27 | 100 |
| Ex. 23 | 54 | 23 | 370 | 5 | 28 | 295 | 170 | 20 | 150 |
| Ex. 24 | 64 | 26 | 370 | 6 | 29 | 295 | 195 | 22 | 150 |
| Ex. 25 | 63 | 28 | 370 | 6 | 32 | 290 | 225 | 28 | 100 |
| Ex. 26 | 82 | 36 | 372 | 5 | 27 | 290 | 180 | 20 | 120 |
| Ex. 27 | 85 | 36 | 373 | 5 | 27 | 275 | 200 | 23 | 100 |
| Ex. 28 | 88 | 40 | 374 | 5 | 24 | 272 | 200 | 24 | 110 |

TABLE 6-continued physical properties of bottles

| | | | | | | | | | |
|---|---|---|---|---|---|---|---|---|---|
| Ex. 29 | 110 | 62 | 376 | 4 | 26 | 299 | 180 | 19 | 130 |
| Ex. 30 | 83 | 70 | 378 | 3 | 28 | 315 | 160 | 20 | 130 |
| Ex. 31 | 78 | 25 | 370 | 6 | 25 | 310 | 160 | 18 | 150 |
| Ex. 32 | 79 | 36 | 370 | 5 | 26 | 285 | 135 | 10 | 160 |
| C. Ex. 4 | 41 | 20 | 365 | 18 | 19 | 327 | 250 | 8 | 190 |
| C. Ex. 5 | 41 | 18 | 362 | 30 | 19 | 330 | 270 | 50 | 40 |
| C. Ex. 6 | 41 | 18 | 362 | 21 | 20 | 335 | 250 | 45 | 45 |

Ex.: Example
C. Ex.: Comparative Example

TABLE 7

| | average density of barrel portion of hollow container (g/cm$^3$) | heat resistance (change in capacity: %) | molding temperature (° C.) | blow time (sec) | blow pressure (kg/cm$^2$) |
|---|---|---|---|---|---|
| Examples 16 to 25, 31 and 32 | 1.370 to 1.377 | 0.6 | 100 to 130 | 7 to 15 | 25 to 35 |
| Examples 26 to 29 | 1.368 to 1.372 | 0.5 | 130 to 140 | 7 to 15 | 28 to 37 |
| Example 30 | 1.365 | 0.3 | 150 | 15 | 38 |
| Comparative Example 4 | 1.355 | 3.5 | normal temperature | 4 | 20 |
| Comparative Example 5 | 1.356 | 2.5 | normal temperature | 4 | 20 |
| Comparative Example 6 | 1.354 | 2.3 | normal temperature | 4 | 20 |

EXAMPLES 33 to 49

Comparative Examples 7 to 9

In Examples 33 to 48 and Comparative Examples 7 to 9, preforms were formed with the M100DM injection molding machine of Meiki Co., Ltd. under the conditions of Table 8 at a vacuum degree of 5 Torr by blending the chip PEN polymers and PET polymers obtained in Reference Examples in blending ratios shown in Table 8. The obtained preforms were blow-molded with the LB01 blow-molding machine of Krupp Corpoplast Maschinonbau GmbH. at a molding temperature of 80 to 160° C. to form hollow containers having an inner capacity of 0.5 liter and an average thickness of a barrel portion of 250 to 350 μm. In Comparative Examples 1 to 3, preforms were formed without vacuum suction and hollow containers were molded at a molding temperature of normal temperature.

In Example 49, PEN and PET polymers were melt-kneaded with a double-screw extruder at amolding temperature of 295° C. and pelletized. A hollow container was molded using the obtained pellets in the same manner as described above. The moldability and physical properties of the hollow container are shown in Table 8.

Data on the average density of the barrel portion of a bottle (g/cm$^3$), heat resistance (change in capacity (%)), molding temperature (° C.), blow time (sec) and blow pressure (kg/cm$^2$) of each of these examples are the same as data (Table 7) on examples having numbers 17 smaller than the numbers of examples. Data on comparative examples are the same as data (Table 7) on comparative examples having numbers 3 smaller than the numbers of comparative examples.

TABLE 8

| | type of PEN | type of PET | blending ratio (wt %) | intrinsic viscosity | compatibility | Tm (° C.) | haze (%) | shear rate (sec$^{-1}$) |
|---|---|---|---|---|---|---|---|---|
| Ex. 33 | PEN-3 | PET-1 | 10/90 | 0.680 | 0.21 | 248 | 0.9 | 100 |
| Ex. 34 | PEN-4 | PET-1 | 10/90 | 0.695 | 0.24 | 247 | 0.8 | 105 |
| Ex. 35 | PEN-1 | PET-1 | 10/90 | 0.710 | 0.24 | 247 | 0.7 | 155 |
| Ex. 36 | PEN-2 | PET-1 | 10/90 | 0.698 | 0.23 | 248 | 0.9 | 155 |
| Ex. 37 | PEN-5 | PET-1 | 10/90 | 0.690 | 0.18 | 249 | 0.7 | 150 |
| Ex. 38 | PEN-6 | PET-1 | 10/90 | 0.682 | 0.27 | 246 | 0.9 | 100 |
| Ex. 39 | PEN-1 | PET-2 | 10/90 | 0.661 | 0.22 | 248 | 1.0 | 100 |
| Ex. 40 | PEN-1 | PET-3 | 10/90 | 0.679 | 0.23 | 248 | 0.7 | 150 |
| Ex. 41 | PEN-1 | PET-4 | 10/90 | 0.715 | 0.22 | 246 | 1.0 | 140 |
| Ex. 42 | PEN-1 | PET-5 | 10/90 | 0.541 | 0.21 | 250 | 1.1 | 100 |
| Ex. 43 | PEN-1 | PET-1 | 20/80 | 0.659 | 0.24 | 242 | 1.0 | 120 |
| Ex. 44 | PEN-1 | PET-1 | 30/70 | 0.612 | 0.25 | 240 | 0.9 | 100 |
| Ex. 45 | PEN-1 | PET-1 | 40/60 | 0.588 | 0.26 | 237 | 0.8 | 110 |
| Ex. 46 | PEN-5 | PET-1 | 60/40 | 0.580 | 0.30 | 237 | 1.6 | 130 |
| Ex. 47 | PEN-5 | PET-1 | 80/20 | 0.520 | 0.26 | 258 | 1.9 | 130 |

TABLE 8-continued

| | | | | | | | | |
|---|---|---|---|---|---|---|---|---|
| Ex. 48 | PEN-1 | PET-6 | 10/90 | 0.635 | 0.21 | 248 | 0.8 | 150 |
| Ex. 49 | PEN-1 | PET-1 | 10/90 | 0.679 | 0.28 | 245 | 0.9 | 160 |
| C. Ex. 7 | PEN-7 | PET-7 | 4/96 | 0.468 | 0.10 | 254 | 13.1 | 192 |
| C. Ex. 8 | PEN-8 | PET-8 | 2/98 | 0.490 | 0.55 | 250 | 3.7 | 43 |
| C. Ex. 9 | PEN-8 | PET-8 | 10/90 | 0.478 | 0.60 | 237 | 1.5 | 45 |

| | amount of ½Sb + Ge (ppm) | amount of P (ppm) | UV cut wavelength (nm) | amount of acetaldehyde (μg/L · day) | buckling strength (kg/cm$^2$) | molding temperature (° C.) | residence time (sec) | plasticating time (sec) |
|---|---|---|---|---|---|---|---|---|
| Ex. 33 | 110 | 36 | 370 | 4 | 31 | 279 | 180 | 20 |
| Ex. 34 | 83 | 34 | 370 | 3 | 29 | 283 | 193 | 23 |
| Ex. 35 | 81 | 37 | 370 | 3 | 32 | 284 | 140 | 13 |
| Ex. 36 | 82 | 35 | 370 | 3 | 30 | 279 | 170 | 19 |
| Ex. 37 | 81 | 40 | 370 | 6 | 30 | 300 | 150 | 17 |
| Ex. 38 | 80 | 32 | 370 | 2 | 26 | 270 | 220 | 34 |
| Ex. 39 | 74 | 33 | 370 | 3 | 30 | 275 | 200 | 28 |
| Ex. 40 | 54 | 23 | 370 | 4 | 27 | 290 | 165 | 19 |
| Ex. 41 | 64 | 26 | 370 | 4 | 28 | 290 | 185 | 23 |
| Ex. 42 | 63 | 28 | 370 | 5 | 30 | 290 | 225 | 28 |
| Ex. 43 | 82 | 36 | 372 | 4 | 28 | 285 | 180 | 21 |
| Ex. 44 | 85 | 36 | 373 | 4 | 26 | 271 | 195 | 23 |
| Ex. 45 | 88 | 40 | 374 | 4 | 24 | 270 | 200 | 25 |
| Ex. 46 | 110 | 62 | 376 | 3 | 25 | 295 | 176 | 20 |
| Ex. 47 | 83 | 70 | 378 | 3 | 27 | 310 | 200 | 20 |
| Ex. 48 | 78 | 25 | 370 | 5 | 24 | 305 | 155 | 18 |
| Ex. 49 | 80 | 37 | 370 | 5 | 27 | 285 | 135 | 10 |
| C. Ex. 7 | 41 | 20 | 365 | 20 | 20 | 327 | 252 | 9 |
| C. Ex. 8 | 41 | 18 | 362 | 34 | 21 | 330 | 270 | 52 |
| C. Ex. 9 | 41 | 18 | 362 | 34 | 19 | 335 | 255 | 44 |

Ex.: Example
C. Ex.: Comparative Example

What is claimed is:

1. A bottle made of an aromatic polyester composition comprising:
   (a) pellets of an ethylene naphthalenedicarboxylate copolymer which contains an ethylene naphthalenedicarboxylate unit in an amount of 94 to 80 mol % based on the total of all the recurring units and an ethylene terephthalate unit and/or an ethylene isophthalate unit in an amount of 6 to 20 mol % based on the total of all the recurring units and a diethylene glycol component in an amount of 0.8 to 2.5 wt % and which has a number of terminal carboxyl groups of 40 eq/10$^6$ g or less and a total number of terminal groups of 95 eq/10$^6$ g or more, and
   (b) pellets of an ethylene terephthalate (co)polymer which contains an ethylene terephthalate unit in an amount of 100 to 80 mol % and an ethylene naphthalenedicarboxylate unit and/or an ethylene isophthalate unit in an amount of 0 to 20 mol %, provided that the total of the ethylene terephthalate unit and the ethylene naphthalenedicarboxylate unit and/or ethylene isophthalate unit is 100 mol %, and a diethylene glycol component in an amount of 1.2 to 2.4 wt % and which has a number of terminal carboxyl groups of 30 eq110$^6$ g or less, an intrinsic viscosity of 0.7 or more and a melting temperature of 250° C. or less, the size of each of said pellets being such that 90 wt % or more of all the pellets pass through an ASTM-based 4-mesh sieve but not a 10-mesh sieve and the contents of the ethylene naphthalenedicarboxylate copolymer and the ethylene terephthalate (co)polymer being 5 to 95 wt % and 95 to 5 wt % based on the total weight of these, respectively;
   wherein compatibility between the ethylene naphthalenedicarboxylate copolymer and the ethylene terephthalate (co)polymer is 0.15 to 0.5; and
   wherein the relationship represented by the following expression (1) is satisfied when the proportion of the ethylene naphthalenedicarboxylate unit to the total of all the recurring units of the ethylene naphthalenedicarboxylate copolymer and all the recurring units of the ethylene terephthalate (co)polymer is 50 mol % or less:

$$Tm \leq 254 - 28 \times EN \quad (1)$$

wherein EN is molar fraction of the ethylene naphthalenedicarboxylate unit in the polyester composition and Tm is the melting point (° C.) of the polyester composition, and the relationship represented by the following expression (2) is satisfied when the proportion of the ethylene naphthalenedicarboxylate unit to the total of all the recurring units of the ethylene naphthalenedicarboxylate copolymer and all the recurring units of the ethylene terephthalate (co)polymer is more than 50 mol %:

$$Tm \leq 267 - 54 \times EN \quad (2)$$

wherein Tm and EN are the same as defined in the above expression (1).

2. The bottle of claim 1 wherein the amount of acetaldehyde scattered into the space of the bottle is 10 μ/l·day or less.

3. The bottle of claim 1 which has an average density of 1.34 to 1.40 g/cm$^3$.

4. The bottle of claim 1 which has a hydrothermal shrinkage at 90° C. of 1% or less.

5. A collection container for blood samples, medical container or cosmetic container made of an aromatic polyester composition comprising:
   (a) pellets of an ethylene naphthalenedicarboxylate copolymer which contains an ethylene naphthalenedicarboxylate unit in an amount of 94 to 80 mol % based on the total of all the recurring units and an ethylene terephthalate unit and/or an ethylene isophthalate unit in an amount of 6 to 20 mol % based on the total of all the recurring units and a diethylene glycol component in an amount of 0.8 to 2.5 wt % and which has a number of terminal carboxyl groups of 40 eq/$10^6$ g or less and a total number of terminal groups of 95 eq/$10^6$ g or more, and (b) pellets of an ethylene terephthalate (co)polymer which contains an ethylene terephthalate unit in an amount of 100 to 80 mol % and an ethylene naphthalenedicarboxylate unit and/or an ethylene isophthalate unit in an amount of 0 to 20 mol %, provided that total of the ethylene terephthalate unit and the ethylene naphthalenedicarboxylate unit and/or ethylene isophthalate unit is 100 mol %, and a diethylene glycol component in an amount of 1.2 to 2.4 wt % and which has a number of terminal carboxyl groups of 30 eq/$10^6$ g or less, an intrinsic viscosity of 0.7 or more and a melting temperature of 250° C. or less, the size of each of said pellets being such that 90 wt % or more of all the pellets pass through an ASTM-based 4-mesh sieve but not a 10-mesh sieve and the contents of the ethylene naphthalenedicarboxylate copolymer and the ethylene terephthalate (co)polymer being 5 to 95 wt % and 95 to 5 wt % based on the total weight of these, respectively;

wherein compatibility between the ethylene naphthalenedicarboxylate copolymer and the ethylene terephthalate (co)polymer is 0.15 to 0.5; and wherein the relationship represented by the following expression (1) is satisfied when the proportion of the ethylene naphthalenedicarboxylate unit to the total of all the recurring units of the ethylene naphthalenedicarboxylate copolymer and all the recurring units of the ethylene terephthalate (co)polymer is 50 mol % or less:

$$Tm \leq 254 - 28 \times EN \tag{1}$$

wherein EN is molar fraction of the ethylene naphthalenedicarboxylate unit in the polyester composition and Tm is the melting point (° C.) of the polyester composition, and the relationship represented by the following expression (2) is satisfied when the proportion of the ethylene naphthalenedicarboxylate unit to the total of all the recurring units of the ethylene naphthalenedicarboxylate copolymer and all the recurring units of the ethylene terephthalate (co)polymer is more than 50 mol %:

$$Tm \leq 267 - 54 \times EN \tag{2}$$

wherein Tm and EN are the same as defined in the above expression (1).

* * * * *